United States Patent [19]
Ropiequet

[11] 3,961,000
[45] June 1, 1976

[54] METHOD OF MANUFACTURING A NESTING OR INTERLOCKING LOOSE-FILL CELLULAR PACKING MATERIAL

[75] Inventor: Richard L. Ropiequet, Portland, Oreg.

[73] Assignee: Altainer Incorporated, Pico Rivera, Calif.

[22] Filed: June 7, 1974

[21] Appl. No.: 477,298

Related U.S. Application Data

[63] Continuation of Ser. No. 310,151, Nov. 28, 1972, abandoned.

[52] U.S. Cl............................... 264/45.5; 264/53; 264/142; 428/315; 428/402
[51] Int. Cl.² ................................ B29D 27/00; B29C 17/10
[58] Field of Search .............. 264/51, 53, 142, 55, 264/45.5; 428/315, 402

[56] References Cited
UNITED STATES PATENTS

| 2,576,977 | 12/1951 | Stober............................ 264/142 X |
| 2,918,701 | 12/1959 | Hull et al........................... 264/142 |
| 3,033,806 | 5/1962 | Spencer................................ 264/53 |
| 3,066,382 | 12/1962 | Zweigle et al. .................. 264/51 X |
| 3,372,215 | 3/1968 | Muirhead et al. .................... 264/53 |
| 3,400,037 | 9/1968 | Sare et al......................... 264/51 X |
| 3,436,449 | 4/1969 | Treu et al. ......................... 264/142 |
| R27,243 | 12/1971 | Sare et al......................... 264/51 X |

FOREIGN PATENTS OR APPLICATIONS

| 774,681 | 5/1957 | United Kingdom................. 264/142 |
| 849,935 | 9/1960 | United Kingdom................. 264/142 |

Primary Examiner—Philip Anderson
Attorney, Agent, or Firm—Fraser and Bogucki

[57] ABSTRACT

The invention relates to a method for producing loose-fill packing material in the form of hollow, substantially hemispherical bodies made from an extrudable, expandable synthetic plastic composition.

7 Claims, 9 Drawing Figures

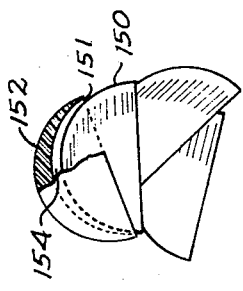
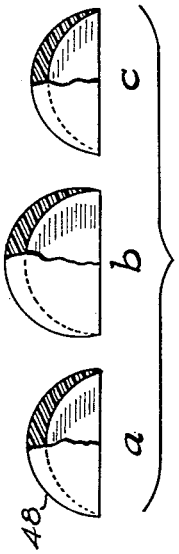
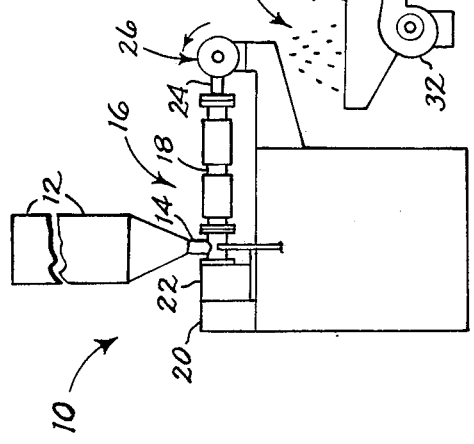
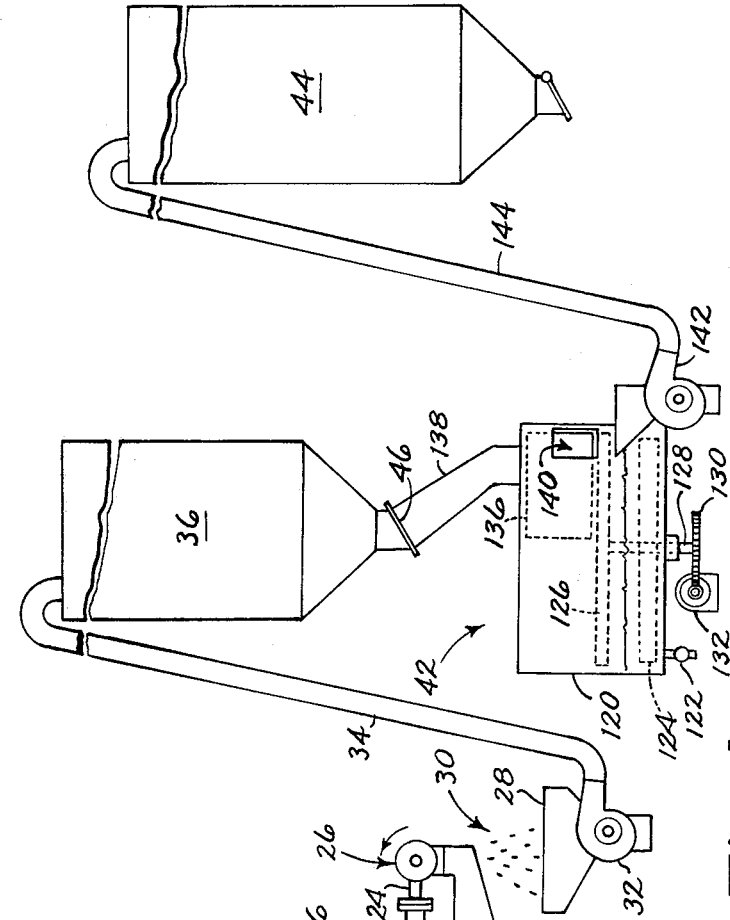

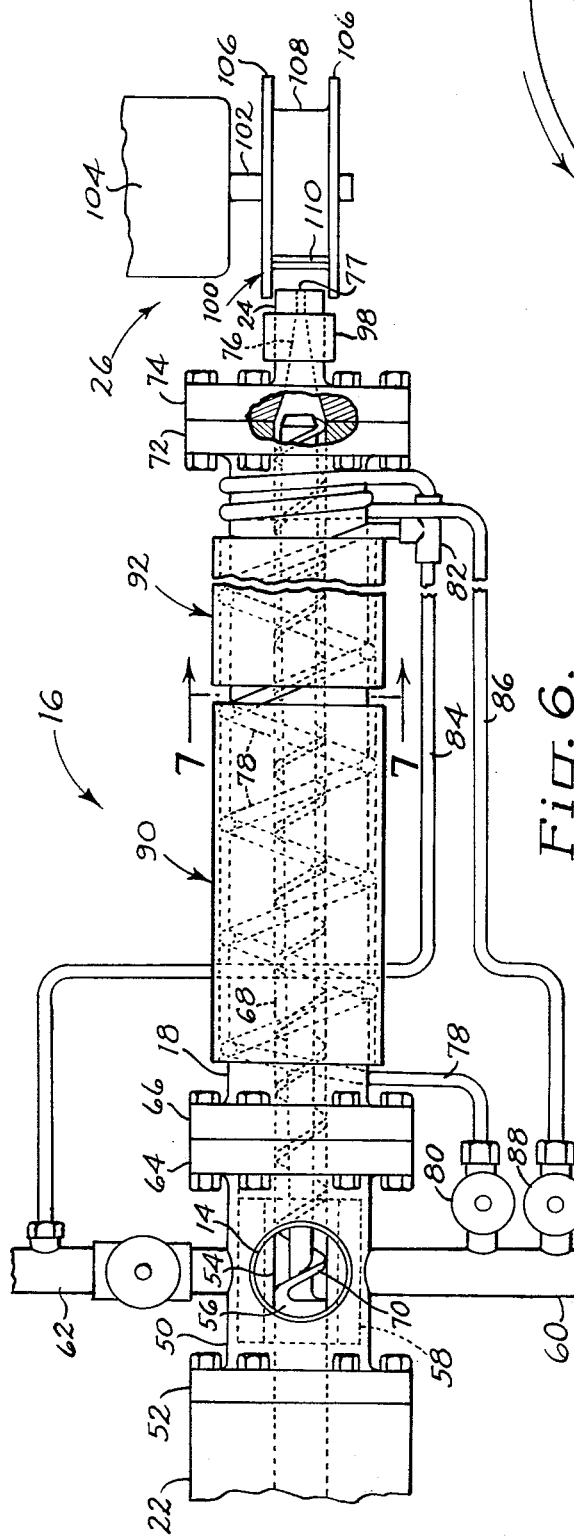

METHOD OF MANUFACTURING A NESTING OR INTERLOCKING LOOSE-FILL CELLULAR PACKING MATERIAL

CROSS-REFERENCE TO RELATED APPLICATION

This is a continuation of application Ser. No. 310,151, filed Nov. 28, 1972 now abandoned.

BACKGROUND AND SUMMARY OF THE INVENTION

The present invention relates generally to a method for producing articles from an extrudable, expandable synthetic plastic composition, and more particularly to the production of resilient plastic foam bodies having a nesting or interlocking configuration for use as a free-flowing, loose-fill packing material.

Packing materials comprising a multiplicity of plastic foam bodies made from an extrudable, expandable thermoplastic material, such as a polystyrene composition, are well known. As disclosed, for example, in U.S. Pat. Re. No. 27,243, dated Dec. 14, 1971, and assigned to the assignee of the present invention, such expanded foam plastic packing materials have many advantages over conventional materials such as excelsior or shredded newspaper. Among others, the expanded foam plastic materials are resistant to fungus growth, do not readily absorb moisture, and have good heat and electrical insulation properties. In addition, the plastic bodies may be configured to pour freely and flow around an object placed in a shipping container, then to interlock and prevent settling of the packing material when compressed.

With packing materials in general, and expanded foam plastic loose-fill materials in particular, it is important that the product have a low bulk density so that the gross weight of a filled package, and consequently its shipping cost, is minimized. Reducing bulk density also reduces manufacturing costs, since less raw material is needed for a given volume of product. It is, therefore, a principal object of the present invention to provide a method for producing a loose-fill packing material having a very low bulk density.

A more specific object is to provide a method for producing an improved packing material comprised of expanded foam plastic bodies having a low bulk density-producing configuration.

Another object of the invention is to provide an improved method for producing low density, expanded foam plastic bodies which are readily pourable, but which interlock or nest together when compressed, to prevent settling.

Still another object of the invention is to provide a method for producing expanded foam plastic bodies which interlock or nest together in such a way that void spaces are created between them.

A number of methods for producing expanded synthetic plastic packing materials are known in the prior art. Such methods include those disclosed, for example, in U.S. Pat. No. 3,188,264 and above-cited U.S. Pat. Re. No. 27,243, wherein an expandable synthetic plastic composition, such as polystyrene, is extruded through a die orifice and allowed to expand into an elongate rod or strip. The expanded rod is drawn forward from the die by conveying apparatus, commonly called a "puller", which supports the flexible rod for a distance, then feeds it into a cutter where the rod is sliced into segments of a desired length. Finally, the segments are warped and/or expanded further by a steam atmosphere exposure to produce a loose-fill packing material.

The methods disclosed in these patents have a number of drawbacks, however. They include the necessity of providing a puller to support the extrudate, i.e., the rod or strip, as it expands and cools prior to cutting. Moreover, the puller's speed must be carefully controlled to match that of both the extruder and the cutter. Otherwise, product quality will vary. Cutting an already expanded plastic foam ruptures cells on either side of the cut, weakening the foam body thus produced. In addition, the broken cells limit the amount of expansion or warping which can be achieved in the subsequent steaming process. This results in a final product having an undesirably high bulk density. The detrimental effects of cell rupturing are particularly significant when thin sections or chips are produced, since the ruptures may extend through the entire thickness of such a chip. Cutting an already expanded foam also requires considerable mechanical power and, particularly with polystyrene foams, is hard on cutter blades. Wear and breakage of the blades force frequent blade changes, increasing production costs.

In U.S. Pat. No. 2,576,977, a method is disclosed for making free-flowing cellular pellets by cutting an extruded thermoplastic composition into globules or segments as it emerges from a die and before substantial expansion occurs, and thereafter allowing the cut-off segments to expand. The resultant product of the disclosed method consists of spheres and ovoids, body forms which are undesirable for use as a packing material because they lack any ability to interlock or nest together to prevent settling of a packed object. Moreover, the bulk density of a mass of foam spheres or ovoids is undesirably high for economical use as a packing material.

Accordingly, a further object of the invention is to provide an improved method for producing an expanded foam packing material which eliminates these and other drawbacks of prior art methods.

BRIEF DESCRIPTION OF THE DRAWINGS

These and other objects and advantages of the instant invention will become more apparent as the description which follows is read in conjunction with the accompanying drawings, wherein:

FIG. 1 is a foreshortened schematic view in side elevation of apparatus for producing expanded foam plastic bodies according to the present invention;

FIG. 2 is a side view, partially broken away, of an initially obtained hollow, substantially hemispherical foam body before subsequent post-expansion processing;

FIGS. 3 and 4 are side views, partially broken away, of initially obtained foam bodies after subsequent post-expansion process steps;

FIG. 5 is a side view, partially broken away, showing several of the hollow, substantially hemispherical foam bodies in nested relationship;

FIG. 6 is a foreshortened top plan view, partially broken away to disclose details of internal construction, of the extruder and cutter components of the apparatus shown in FIG. 1;

FIG. 7 is a sectional view taken along line 7—7 of FIG. 6;

FIG. 8 is a partial plan view in enlarged scale of the cutter apparatus shown in FIG. 6; and FIG. 9 is an elevation view, partially broken away, taken on line 9—9 of FIG. 8.

DETAILED DESCRIPTION OF THE INVENTION

Broadly stated, the invention contemplates initially producing expanded foam plastic articles having a hollow, substantially hemispherical configuration, then subsequently re-expanding them to obtain a packing material having a desirably lower bulk density. Apparatus useful for practicing the invention is schematically illustrated in FIG. 1, and includes an extrusion device, designated generally at 10, including a hopper 12 containing a supply of an extrudable, expandable thermoplastic composition, preferably in the form of granules or beads. Such compositions are well known in the art and include compositions comprising polystyrene or other suitable polymers as disclosed, for example, in U.S. Pat. Nos. 2,983,692, 2,941,964, 2.941,965, 3,066,382 and 3,251,728. A mixture comprising 98+ per cent by weight extrusion grade expandable polystyrene beads, sold by Koppers Co., Inc. under the trademark Dylite, together with suitable expanding agents, has been employed with good success.

The constricted, bottom discharge end 14 of hopper 12 communicates with the infeed end of extruder portion 16. Portion 16, which will be described in greater detail below, includes a variable root diameter extruder screw (now shown) mounted for rotation inside extruder barrel 18 and driven by an electric motor 20 through a gear reduction unit 22. As expandable thermoplastic beads flow from the hopper into extruder portion 16, rotation of the screw moves them from the infeed end of barrel 18, adjacent hopper discharge end 14, toward an extruder die 24. As the solid thermoplastic composition is moved along the barrel by the screw, it is subjected to increasing pressure. At the same time, the composition is heated to progressively higher temperatures until it melts into a viscous liquid mixture. The molten material then is forced out through an orifice in extruder die 24, and is divided into a multiplicity of thin sections as it emerges from the orifice, by a revolving cutting mechanism 26.

The molten thermoplastic composition within die 24 is under substantial pressure, and as the molten plastic passes through the orifice into the lower pressure of the surrounding atmosphere, the composition starts to expand into a cellular structure many times the diameter of the orifice.

It is important in the practice of the invention that the expandable composition be divided or cut into thin sections as it emerges from the orifice and before appreciable expansion has occurred. By so doing, the extruded composition or mixture is divided while still in a molten state, and before any appreciable cell formation substantially eliminating ruptured cells in the subsequently produced foam bodies. Thus, bodies may be formed from very thin sections without the drawbacks previously mentioned. In addition, cutting the extrudate in its still molten state greatly reduces cutting blade wear and substantially eliminates blade breakage.

The thin sections cut from the extrudate are propelled by cutting mechanism 26 toward a collection hopper 28. During their travel through the air, the cut sections rapidly expand into foam bodies. This expansion is accompanied by simultaneous cooling, so that the bodies solidify a short distance from the die, before reaching collection hopper 28. Depending in part upon the conditions of extrusion and the thickness of the cut sections, the thus formed bodies have a hollow, substantially hemispherical configuration. FIG. 2 illustrates such an initially expanded foam body 30 which, as shown, includes a convex surface 30a and a concave surface 30b, with the intersection of these surfaces forming an edge 30c which delineates the perimeter of the concave surface.

The initially expanded foam bodies 30 collected by hopper 28 are conveyed by a blower fan 32 upward through a duct 34 into a storage container 36. The articles thus produced may be used for various purposes, such as a packing material. However, in their initially expanded form the foam bodies have a bulk density which is undesirably high for use as an economical loose-fill packing material. For this reason, the initially expanded bodies are typically re-expanded in a steam atmosphere to provide a significantly larger foam body having a reduced bulk density.

Referring again to FIG. 1, initially expanded bodies 30 are fed from storage container 36 into a post-expansion unit 42 wherein the bodies are deposited onto a moving conveyor in an atmosphere of steam. As the bodies progress through the post-expansion unit to a point of discharge, the environment of elevated temperature and steam causes the bodies to substantially expand in dimension while retaining the same configuration. FIG. 3 shows a re-expanded body 38 resulting from subjecting an initially expanded body 30 to the action of steam at an elevated temperature.

Upon leaving post-expansion unit 42, the re-expanded bodies are conveyed to storage container 44. This container preferably is made of screen or other open mesh material to permit free circulation of air and thus facilitate drying of the re-expanded bodies.

It should be noted that initially expanded bodies 30 may be re-expanded immediately after their formation. However, a greater degree of expansion, and consequently a lower bulk density, results from storing the initially formed bodies for a few hours prior to re-expanding them. Valve means 46 at the outlet end of storage container 36 allows a quantity of bodies 30 to be accumulated and stored prior to the re-expansion process.

Referring now to FIG. 6 of the drawings, extruder portion 16 includes an infeed housing 50 secured at rearward flanged end 52 to the output end of gear reduction unit 22. Infeed housing 50 has a central bore 54 with the infeed end of an extruder screw 56 removably received therein. At its rear end, extruder screw 56 is connected for rotation to gear reduction unit 22. Discharge end 14 of hopper 12 communicates with bore 54 and projects upward therefrom through housing 50. Infeed housing 50 is cooled by the circulation of water through an annular chamber 58 surrounding bore 54 and communicating with infeed and drain conduits 60 and 62, respectively. Housing 50 thus is maintained at a temperature sufficiently low to prevent the thermoplastic composition from melting in the infeed housing or in the discharge end of the hopper.

Forward flanged end 64 of housing 50 is secured to the rearward flanged end 66 of extruder barrel 18. Barrel 18 has an axial bore 68 coaxial with and of the same diameter as bore 54, and receives the forward portion of extruder screw 56 therein. As illustrated, extruder screw 56 has a helical rib 70 of constant pitch and diameter, and a root diameter which increases uniformly from the infeed end to the outfeed end of the screw.

Forward flanged end 72 of barrel 18 is secured to rearward flanged end 74 of extruder die 24. Die 24 is provided with a central bore 76 coaxial with bore 68 of the extruder barrel. Die bore 76 tapers from a diameter substantially the same as that of bore 68 to a smaller diameter at outlet orifice 77, which predetermines the diameter of the extruded composition prior to expansion.

To provide for controlling the temperature of the thermoplastic composition as it progresses forward, i.e., toward the right in FIG. 6, through bore 68, a cooling conduit 78 is coiled helically about barrel 18, retained in a helical groove provided in the outer surface of the barrel. The rearward end of conduit 78 is connected through a control valve 80 to a supply conduit 60. The forward end of conduit 78 terminates rearward of the forward end of extruder barrel 18, and is connected through a T-coupling 82 and an outlet conduit 84 to drain conduit 62.

A second cooling conduit 86 is coiled helically above the forward end of the extruder barrel. One end of this conduit is connected through a control valve 88 to supply conduit 60, and the opposite end through T-coupling 82 to outlet conduit 84.

Removably enclosing cooling coil 78 and extruder barrel 18 is a pair of electrical heater units 90 and 92. Referring to FIG. 7 along with FIG. 6, each heater unit includes a pair of elongate, semicircular members 93 of electrically nonconducting material, each containing an electrical heating element. Members 93 are joined together along one of their adjacent edges by hinge means 94, and along their opposite adjacent edges by clamp means 96. Thus, the two halves of a heater unit easily may be removed and replaced if necessary. A third heater unit 98 of similar construction removably encircles extruder die 24 forward of mounting flange 74.

Each of the three heater units has its own adjustable control (not shown) so that each associated zone of the extruder may be varied in temperature independently of the others.

Referring now to FIGS. 8 and 9 in conjunction with FIG. 6, cutting mechanism 26 includes a cutter wheel 100 suitably mounted on output shaft 102 of an electric motor 104. This motor preferably is of the variable speed type, so that the rotational speed of the shaft, and hence the cutter wheel, may be controlled. As best shown in FIGS. 8 and 9, wheel 100 includes a pair of spaced opposing circular flange portions 106 integrally joined to concentric hub portion 108. Removably mounted for rotation with wheel 100 is a cutter blade 110, which may suitably be an injector-type razor blade.

As shown in the drawings, the end portions of blade 110 are received within a pair of opposing slot-like apertures 112 in flange portions 106, securely retained by a pair of set screws 114. Blade 110 is disposed so that, with rotation of wheel 100, cutting edge 116 intercepts the molten plastic as it emerges from outlet orifice 77 of die 24, and divides it before appreciable expansion of the composition occurs. It will be evident that the thickness of the cut-off sections is dependent upon the linear speed of the molten extrudate (controlled by extruder screw 56) and the rotational speed of cutter wheel 100. Although either may be varied, ordinarily, the thickness of the cut-off sections is changed by adjusting the speed of cutter motor 104.

As will be appreciated, the viscous, molten plastic flowing through bore 76 flows most slowly in the region adjacent the walls of the bore, with the flow rate increasing toward the center of the bore. Thus, after a mass of extrudate has been intercepted and cut off by blade 110, the plastic emerging from orifice 77 will bulge out, as shown in FIG. 8, forming a protruding mass 79 bounded by a convex surface that extends from the perimeter of the orifice in a partial spherical sweep. The speed of cutter wheel 100 is adjusted so that the extrudate is repeatedly divided at the orifice into thin sections, each consisting of a cut-off protruding mass 79. As will be evident from a consideration of the manner in which the extrudate is divided, as shown in FIGS. 8 and 9, each such section is bounded by a major convex, partially spherical surface, and a minor surface which is substantially planar as compared to the major surface, with the intersection of the two surfaces forming an edge which delineates the perimeter of the cut-off section. Viewed along an axially bisecting plane, the cut-off section has a nonuniform thickness, tapering smoothly from a relatively thin edge at its perimeter to a region of maximum thickness at its center. By adjusting the speed of the cutter wheel in this manner, the cut-off sections expand into foam bodies having the desired hollow, substantially hemispherical configuration previously described.

Referring again to FIG. 1, post-expansion unit 42 comprises a hollow, closed tank 120 provided with means for introducing water into the bottom of the tank, such as valved inlet 122. An electrical heater 124 is provided within the tank for heating the water to boiling and thus generating an atmosphere of steam within the tank. A circular perforate plate 126 is supported for rotation within the tank by a vertical shaft 128 which extends down through the bottom of the tank. The lower end of shaft 128 is connected through gear means 130 to an electric drive motor 132.

An elongate deflector blade 136 is mounted within tank 120 closely overlying perforate plate 126. Blade 136 extends inwardly from one end of the tank to intercept initially expanded foam bodies previously deposited upon the plate behind blade 136 through duct 138. After the bodies have been subjected to the atmosphere of steam within tank 120 while being carried on plate 120 for a revolution thereof, they are intercepted by blade 136 and deflected outwardly through an opening 140 in the front wall of the tank. From tank 120, they are conveyed to storage container 44 by a blower 142 and its associated duct 144. As mentioned previously, the re-expanded bodies preferably are stored in container 44 for several hours, then again re-expanded by a second exposure to a steam atmosphere in apparatus similar to expansion unit 42.

EXAMPLE

To illustrate the practice of the invention, a quantity of expandable polystyrene beads, supplied by Koppers Co., Inc., under the designation Dylite KEP 533, is mixed with 0.4% by weight ammonium bicarbonate, 0.4% sodium bicarbonate, and 0.05% Amaplast Blue ZNK (a blue pigment), and the mixture poured into hopper 12 of extrusion device 10. The extruder screw of device 10 is approximately 20 inches long and one inch in diameter, and motor 20 is adjusted to provide a screw speed of about 100 rpm. Outlet orifice 77 of die 24 is 11/64 inch in diameter.

The flow of cooling liquid through chamber 58 is adjusted to maintain the temperature at the infeed end of the screw at about 100°F. Heater unit 90 and control valve 80 are adjusted to provide a temperature of about 220°F. in the zone of barrel 18 adjacent heater 90, and the temperature in the zone adjacent heater 92 is similarly adjusted to about 230°F. Heater unit 98 is set to provide a die temperature of about 230°F. Cutter wheel 100, which has an overall diameter of about 4½ inches and a cutting radius of about 2 inches, is adjusted to a speed of about 3600 rpm.

Under these conditions, foam bodies 30 are produced having the hollow, substantially hemispherical configuration shown in FIG. 2, and a diameter of about ½ inch. The initially expanded foam bodies have a bulk density of about 2 pounds per cubic foot, measured by weighing a tared container of known volume after it has been filled with a quantity of the foam bodies, compacted by moderate vibration, then refilled and recompacted until no further settling occurs.

The thus produced initially expanded foam bodies 30 are stored for approximately 5 hours, then exposed to steam at atmospheric pressure for about 1¾ minutes. The steam exposure expands bodies 30, resulting in re-expanded bodies 38 having the configuration shown in FIG. 3, an overall diameter of about 13/16 inch, and a bulk density of about 0.45 pounds per cubic foot. A group of similar bodies 30 re-expanded immediately after forming has a bulk density of about 0.65 pounds per cubic foot.

Re-expanded bodies 38 are again stored for about 4½ hours, then exposed to steam at atmospheric pressure for about 1 ¼ minutes. The resulting re-expanded bodies 48 have a configuration similar to that shown in FIG. 4a, a diameter of about 1 inch, and a bulk density of about 0.3 pounds per cubic foot.

In the practice of the invention as just described, various factors contribute beneficially or adversely to the characteristics of the resultant foam articles. As the molten thermoplastic material leaves the die, the resultant reduction in pressure allows the composition to expand into a cellular structure. To provide the desired hollow, substantially hemispherical configuration, it is important, as mentioned previously, that the molten extrudate be cut as closely as possible to the die's outlet orifice 77, so that the plastic material is divided before any appreciable expansion occurs. Thus, again referring to FIGS. 8 and 9, face 81 of die 24 is configured to complement the circular path (dot-dash line 146) described by cutting edge 116 of blade 110. Although path 146 is shown passing slightly in front of face 81 in the figure for clarity of illustration, die 24 and cutter wheel 100 preferably are disposed so that edge 116 lightly "brushes" the face of the die.

In addition, it has been found desirable to mount blade 110 in wheel 100 so that it is inclined at an angle "A" of about 10° to 15° to a tangent of path 146 taken at edge 116.

As previously mentioned, the thickness of the section cut from the molten extrudate depends upon the relationship between the linear movement of the molten thermoplastic out of orifice 77 and the rotational speed of the cutter wheel. Either or both of these factors is adjusted to produce an initially expanded foam body having the desired hollow, substantially hemispherical configuration. When the sections cut from the extrudate are too thin, the resulting bodies are smaller in diameter than desired and have a shallow concave surface 30b (FIG. 2), resulting in increased bulk density. An overly thick section of extrudate results in a body having a predominantly lenticular, i.e., double convex, configuration.

Another factor contributing to the ultimate characteristics of the finished article is the degree of heating of the thermoplastic composition in the extruder. For example, it has been found that when the temperature of the molten composition is too high, the cut sections expand rapidly but produce a foam having internally ruptured cells and decreased strength. When the temperature of the molten composition is too low, the initial expansion is not sufficient to produce a body having a substantially hemispherical configuration.

Additionally, as will be evident, the degree of expansion of the foam bodies in the post-expansion unit varies with the amount of time the bodies are exposed to the elevated temperature of the steam atmosphere. When the exposure time is excessive, over-expansion of the foam may produce collapsed bodies, rendering the product unsuitable as a loose-fill packing material.

Also, it is known that storage of the initially expanded bodies for at least 1½ but preferably about 4 to 8 hours before the post-expansion steam exposure results in re-expanded bodies having a greater size, and consequently a lower bulk density than those re-expanded immediately after formation. This is thought to result from the diffusion of blowing agent from the solidified plastic into the initially formed cells of the foam which, just after the initial expansion, contain a partial vacuum. In the same manner, storage of the re-expanded foam bodies, preferably for about 4 to 8 hours, followed by a second exposure in a steam atmosphere produces re-expanded bodies having a still lower bulk density.

The preferred product of the invention is a hollow, substantially hemisperical body of cellular foam having a substantially continuous outer skin intergral with and covering the foam. As previously mentioned, articles having such configuration flow freely, as from a storage container, to completely fill a shipping container and surround an object contained therein. When massed together the expanded foam articles produced by the invention tend to nest or interlock with each other. In a mass of packing material comprising a multiplicity of such bodies wherein a plurality are of graded or substantially similar size, the convex portions of at least some of the bodies seat against the perimeters of the concave portions of adjacent bodies without being fully received therein. Such is shown in FIG. 5, wherein the convex portion of a body 150 is seated abutting the perimeter 151 of the concave portion of similar body 152. Since, as shown, the portions do not fully mate, a void space 154 exists between them. As is evident, such void spaces result when the radius of curvature of the convex portion of a body, such as body 150, is greater than the diameter of the perimeter of the concave portion of the abutting body, such as body 152. As will be appreciated, such void spaces in a mass of such material reduce its bulk density.

In addition to the nonshifting and nonsettling characteristics of the packing material produced according to the invention, the known high friction surface characteristics of the expanded material enhances nonshifting contact between abutting bodies when a mass of such a material is compressed.

As used herein, "substantially hemispherical" foam bodies includes foam bodies having a true hemispherical configuration, such as that shown in FIG. 4a. In addition it includes bodies which are somewhat more than and somewhat less than a true hemisphere, such as those shown in FIGS. 4b and 4c, respectively. Between the latter two types, those having bodies which are somewhat more than a true hemisphere are preferred since, as will be evident, such a configuration results in a greater number of void spaces in a mass of material. It will be appreciated that in a process such as described above, the resulting expanded plastic articles may be somewhat ovate or otherwise irregular in configuration. Such irregularly shaped bodies also are considered to be "substantially hemispherical" as the term is used herein.

Although a preferred embodiment of the invention has been described herein, it is understood that variations and modifications are possible without departing from the spirit of the invention. For example, other expandable synthetic plastic compositions well known in the art may be employed in the production of expanded foam plastic bodies according to the invention, it being recognized that in such event the pressure and temperature conditions above illustrated may require adjustment in accordance with the properties of the particular composition used.

It is claimed and desired to secure by Letters Patent:

1. A method of making low bulk density loose-fill packing material having a nesting or interlocking configuration from a molten expandable synthetic plastic composition, comprising the sequential steps of
   a. continuously extruding said composition at a pressure exceeding atmospheric pressure through a die orifice into a region of atmospheric pressure with a lesser flow velocity adjacent the walls of the die bore leading to said die orifice and with such extrusion producing at said orifice, where it faces said region of atmospheric pressure, a protruding mass of said molten material bounded by a convex surface that extends from the perimeter of the orifice in a partial spherical sweep,
   b. repetitively cutting off said protruding mass at said orifice as it continuously extruded and while the material is still substantially molten, with said cutting being along a path which is substantially linear as compared to said convex surface and at a rate sufficiently high relative to the average extrusion velocity to produce a plurality of thin severed sections each section having a thickness substantially less than the width thereof, said severed sections being bounded by said convex surface and an edge extending in a plane subtending said convex surface,
   c. permitting said cut sections to expand under said atmospheric pressure and to cool and form foam plastic bodies having substantially continuous outer integral skins and hollow, substantially hemispherical configurations.

2. The method of claim 1, additionally comprising
   d. subjecting said bodies to an atmosphere of steam for a time sufficient to enlarge their size substantially.

3. The method of claim 2, additionally comprising
   e. storing the enlarged foam plastic bodies at atmospheric temperature and pressure for a minimum of about one and one-half hours, and
   f. subjecting said bodies, following such storage, to an atmosphere of steam for a time sufficient to re-enlarge their size substantially.

4. The method of claim 1, wherein said composition comprises an expandable polystyrene composition.

5. A method of making low bulk density loose-fill packing material having a nesting or interlocking configuration from a molten expandable polystyrene composition, comprising the sequential steps of
   a. continuously extruding said composition at a pressure exceeding atmospheric pressure through a die orifice into a region of atmospheric pressure with a lesser flow velocity adjacent the walls of the die bore leading to said die orifice and with such extrusion producing at said orifice, where it faces said region of atmospheric pressure, a protruding mass of said molten material bounded by a convex surface that extends from the perimeter of the orifice in a partial spherical sweep,
   b. repetitively severing the protruding mass at said orifice along a path which is substantially linear as compared to said convex surface as it is continuously extruded while the material is still substantially molten to produce a plurality of severed sections each section being bounded by a major surface consisting of said convex surface, and a minor surface which is substantially planar as compared to said major surface, with the intersection of the two surfaces forming an edge which delineates the perimeter of the severed mass, the rate of repetitively severing the protruding mass being sufficiently high relative to the average extrusion velocity of the mass to provide each severed section with a thickness between the convex and minor surfaces which is substantially less than the width of the severed section across the convex and minor surfaces,
   c. permitting said several sections to expand under said atmospheric pressure and to cool and form foam plastic bodies having substantially continuous integral skins and hollow, substantially hemispherical configurations,
   d. subjecting said bodies to an atmosphere of steam for a time sufficient to enlarge its size substantially,
   e. storing said enlarged foam plastic bodies at atmospheric temperature and pressure for a minimum of about one and one-half hours, and
   f. subjecting said bodies, following such storage, to an atmosphere of steam for a time sufficient to re-enlarge their size substantially.

6. The method of claim 5, wherein, in step (d), said bodies are subjected to said steam atmosphere for a time sufficient to enlarge their size to provide, a packing material consisting of a multiplicity of such enlarged bodies, having a bulk density of about 0.65 to about 0.45 pounds per cubic foot.

7. The method of claim 6, wherein, in step (f), said bodies are subjected to said steam atmosphere for a time sufficient to enlarge their size to provide, a packing material consisting of a multiplity of such re-enlarged bodies, having a bulk density of less than about 0.40 pounds per cubic foot.

* * * * *

UNITED STATES PATENT OFFICE
CERTIFICATE OF CORRECTION

Patent No. 3,961,000   Dated June 1, 1976

Inventor(s) Richard L. Ropiequet

It is certified that error appears in the above-identified patent and that said Letters Patent are hereby corrected as shown below:

Column 6, line 53, "re-expaned" should read --re-expanded--. Column 9, line 44, after "it" and before "continuously" insert --is--. Column 10, line 40, "several" should read --severed--.

Signed and Sealed this

Seventh Day of September 1976

[SEAL]

Attest:

RUTH C. MASON
*Attesting Officer*

C. MARSHALL DANN
*Commissioner of Patents and Trademarks*